Figure 1:
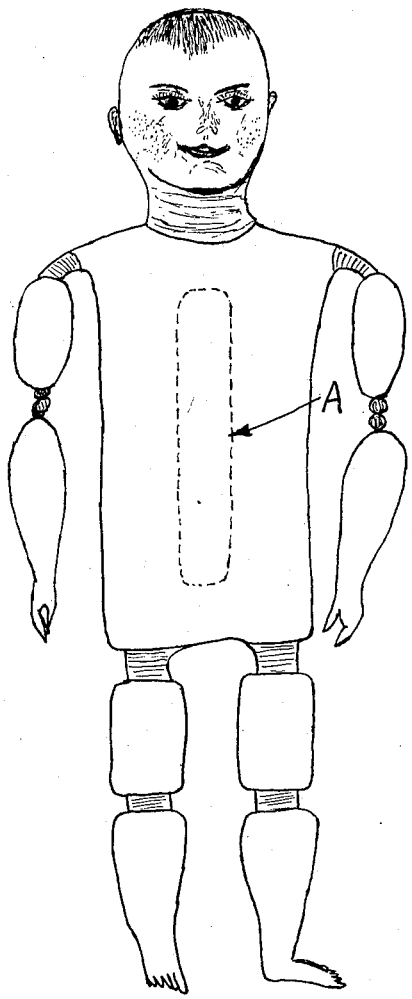

L. W. RICHARDS.
DOLL.
APPLICATION FILED JULY 17, 1918.

1,384,731.

Patented July 12, 1921.

WITNESS:
Byron U. Richards Jr.
John F. Wentworth Jr.

INVENTOR.
Laura W. Richards

UNITED STATES PATENT OFFICE.

LAURA W. RICHARDS, OF PAWTUCKET, RHODE ISLAND.

DOLL.

1,384,731. Specification of Letters Patent. Patented July 12, 1921.

Application filed July 17, 1918. Serial No. 245,433.

*To all whom it may concern:*

Be it known that I, LAURA W. RICHARDS, a citizen of the United States, a legal resident of Pawtucket, Rhode Island, residing at 10 Summer street, Pawtucket, R. I., have invented certain new and useful Improvements in Dolls, and do declare the following to be a full, clear, and exact description of the invention, such as will enable others skilled in the art to which it appertains to make and use the same.

My invention relates to dolls and to that particular class or kind of dolls which are commonly used as manikins or models for the instruction of classes in infant hygiene, and the purpose of my invention is to provide a doll of substantially the size of a human infant which will closely imitate or resemble in its movements the movements of a human infant under similar conditions and which when placed in water will assume substantially the attitude and posture of a human infant when submerged.

I accomplish this purpose by the device shown in the accompanying drawing, which represents a doll or manikin, the arms and legs being jointed and joined to the body by flexible connections and having inserted within the body a weight, represented by A, the location of the weight being such as to cause the doll to take the same posture when submerged in water as with a human infant when submerged. This effect is obtained by positioning the weight at a point approximately the center of gravity of a human infant. The exact location of the weight A is determined by experiment upon each individual doll as the materials of which the doll is composed vary with different specimens. The doll is made of wood or other suitable material, or may be made of papier mâché, and covered in either case with suitable water proof material.

By the use of such a manikin which both in water and out of water will very nearly resemble a human infant in its movements, and which will call for the same kind of handling that a human infant would require both in and out of water, the teaching of infant hygiene is greatly facilitated and simplified.

Instead of the single weight A, more than one weight may be used and distributed in such portions of the body as the construction and specific gravity of the individual doll may seem to require.

Having now described my invention, what I claim and desire to secure by Letters Patent is:—

1. In a manikin for training nurses in the handling of a living child, a body portion formed of flexibly connected sections and a weight permanently positioned in said body portion at a point approximating the center of gravity of a human infant, whereby the manikin when placed in a bath will have portions thereof affected by gravity similar to a living human infant.

2. In a manikin for training nurses in the handling of a living child, a body portion formed of flexibly connected sections and a weight permanently positioned in said body portion at a point approximating the center of gravity of a human infant, the arms and legs being slightly spaced from the body and having freely movable flexible connections with the body, whereby the manikin when placed in a bath will have portions thereof affected by gravity similar to a living human infant.

3. In a manikin for training nurses in the handling of a living child, a body portion formed of flexibly connected sections and a weight permanently positioned in said body portion at a point approximating the center of gravity of a human infant, the arms and legs being slightly spaced from the body and having freely movable flexible connections with the body, said arms and legs being further separated and spaced at the elbows and knees respectively and flexible connections at the spaced elbows and knees, whereby the manikin when placed in a bath will have portions thereof affected by gravity similar to a living human infant.

LAURA W. RICHARDS.